Jan. 19, 1965  G. F. QUAYLE  3,166,208
HOSE GUIDE ARRANGEMENT
Filed Aug. 24, 1962  3 Sheets-Sheet 1
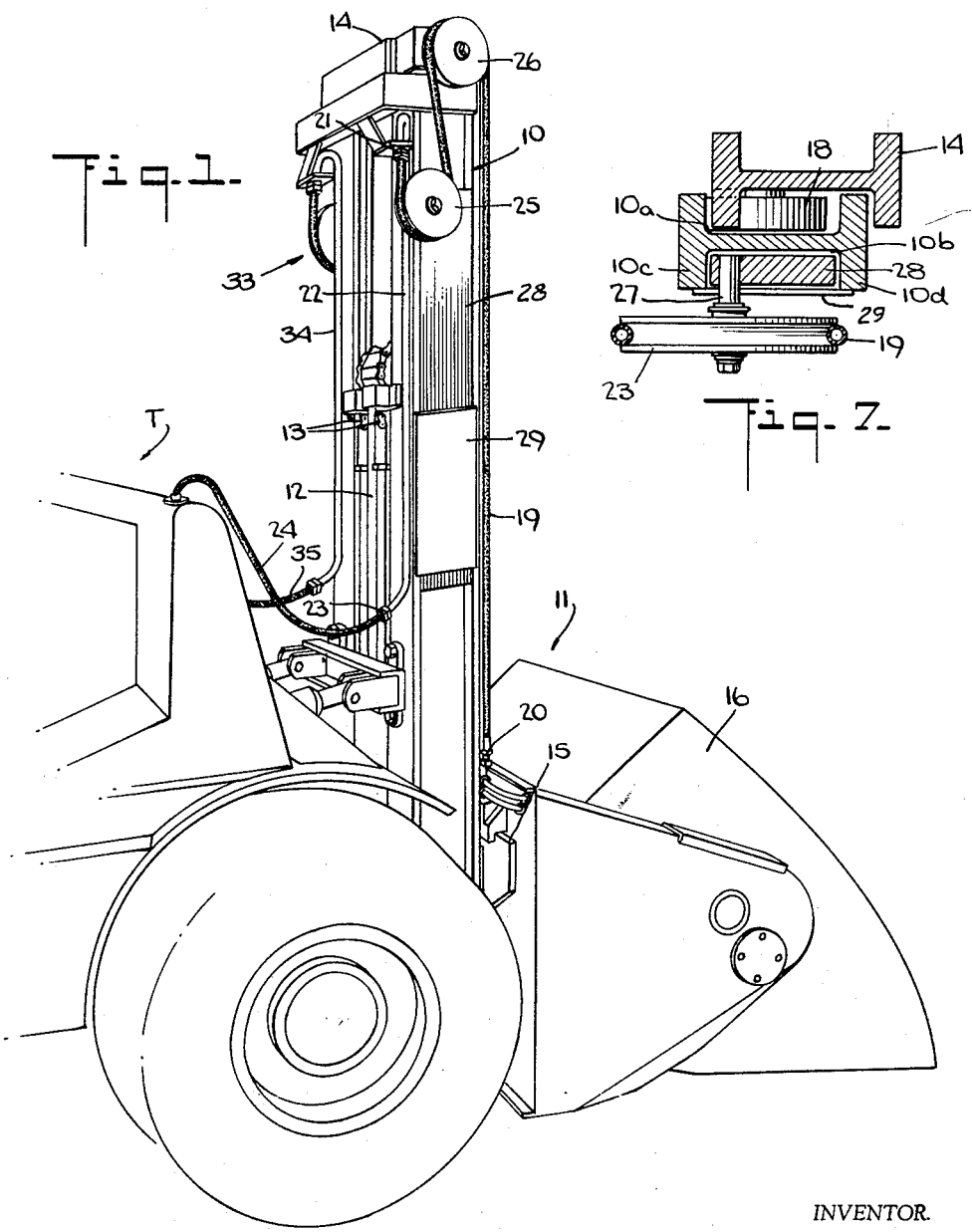
INVENTOR.
GEORGE F. QUAYLE
BY
*A.H. Golden*
ATTORNEY

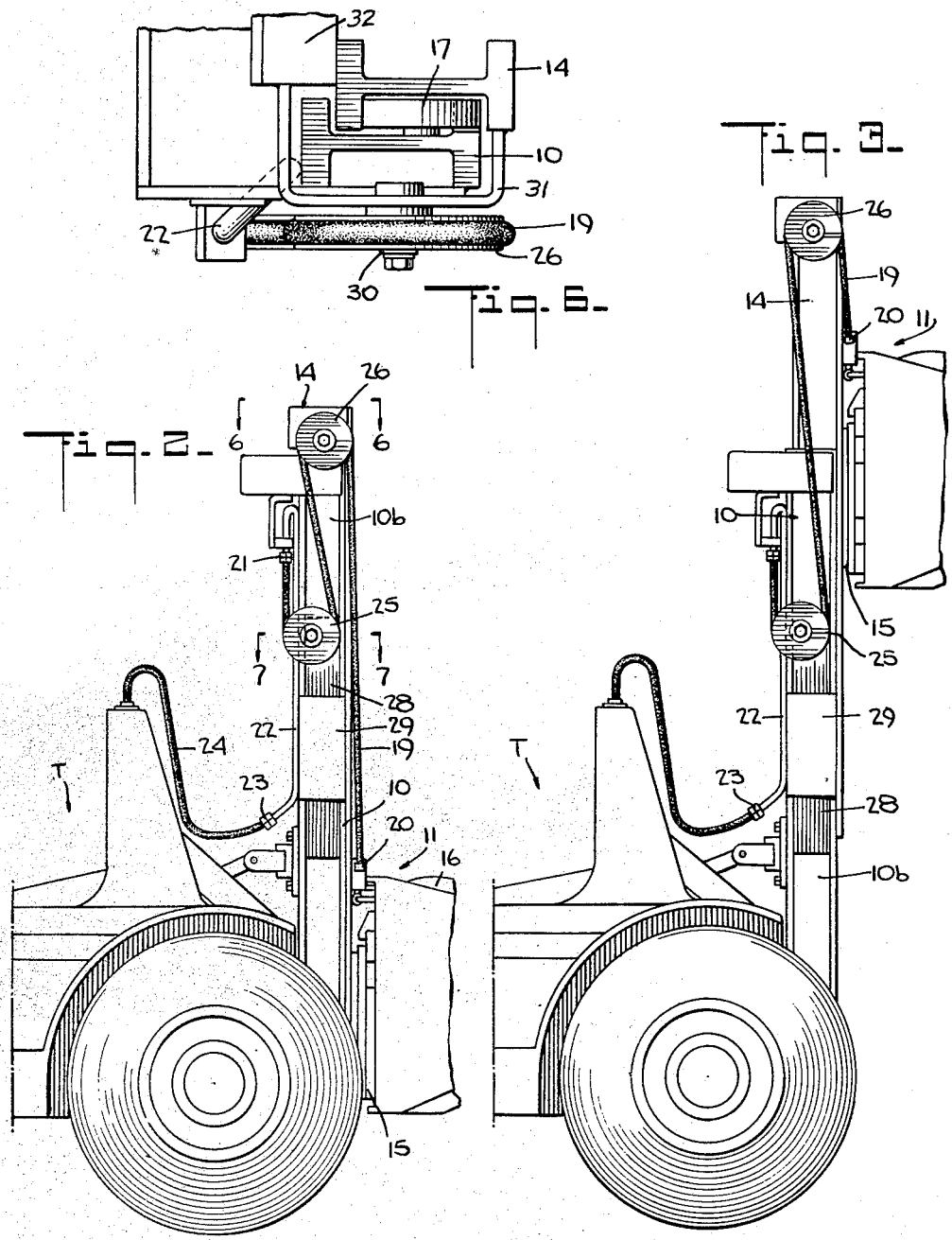

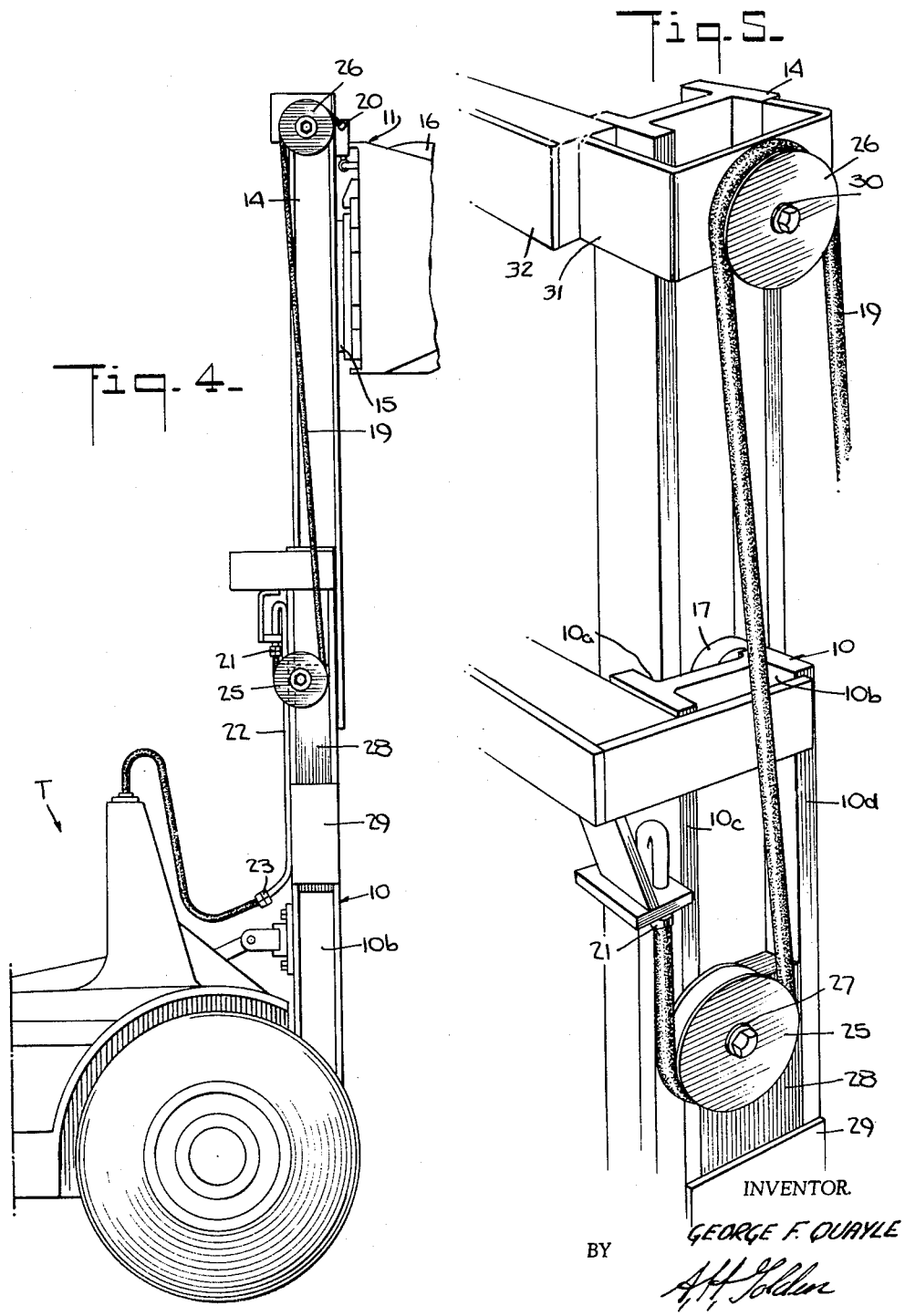

United States Patent Office 3,166,208
Patented Jan. 19, 1965

3,166,208
HOSE GUIDE ARRANGEMENT
George F. Quayle, Philadelphia, Pa., assignor, by mesne assignments, to Yale & Towne, Inc., New York, N.Y., a company of Ohio
Filed Aug. 24, 1962, Ser. No. 219,182
1 Claim. (Cl. 214—701)

This invention relates to a lift truck and in particular to a vertically movable, weighted reel arrangement for guiding and taking up slack in a power line, such as a hose line, connected between the truck body and the vertically movable load lifting structure of the truck.

While the use of a vertically movable, weighted reel for taking up slack of a power line in a lift truck is not new, the arrangements heretofore proposed and used have required separate, relatively expensive guide structures for the weighted reel which must be assembled on the mast structure of the truck. The purpose of this invention is to provide a simpler, less expensive arrangement for guiding the weighted reel during vertical movement thereof in taking up slack of the power line.

To this end, the sliding reel in the arrangement of the invention is mounted on a weighted slide member and the slide member, in turn, mounted for sliding movement in the vertical channel of a primary upright of the lift truck, between the flanges forming the channel. In this manner, the flanges provide the dual function of providing the desired rigidity for the uprights and providing a guide structure for the mounting slide of the sliding reel. The only additional structure necessary to complete the guide arrangement is a simple retainer secured to the upright for retaining the mounting slide within the channel.

As a feature of the invention, the uprights are formed as I sections so that each upright provides two channels. One channel of each upright is utilized in the conventional manner for mounting the load lifting structure such as the secondary uprights and the load carriage for vertical movement, while the other channel of one or both of the uprights is utilized as a guide for the mounting slide for the sliding reel.

The invention and its advantages having been broadly described, a more detailed description of one embodiment of the invention is presented hereafter by reference to the accompanying drawings, wherein:

FIG. 1 is a perspective view of a portion of a lift truck incorporating the sliding reel arrangement of the invention;

FIG. 2 is a side view of the truck shown in FIG. 1, but showing the load carriage partially elevated;

FIG. 3 is a side view, similar to that of FIG. 2, but showing the load carriage further elevated and the secondary uprights partially elevated;

FIG. 4 is a side view similar to that of FIG. 3, but showing the load carriage and secondary uprights fully elevated;

FIG. 5 is a perspective view of a portion of the upright structure of the truck showing the guiding arrangement of the sliding reel arrangement of the invention;

FIG. 6 is a view taken in the direction of the arrows 6—6 of FIG. 2; and

FIG. 7 is a sectional view taken on the line 7—7 of FIG. 2.

Referring to the drawings and in particular to FIGS. 1, 2 and 3, the invention is shown applied to a lift truck T, having a pair of I section primary or stationary uprights 10 mounted on the front end thereof and a load supporting and lifting structure, generally designated by the reference numeral 11, which is adapted to be elevated relatively to the primary uprights 10 in the conventional manner through a ram 12 and chains 13.

In the particular truck illustrated, the load supporting and lifting structure 11 includes I section secondary uprights 14 mounted for vertical movement on the primary uprights 10, a load carriage 15 mounted for vertical movement on the secondary uprights 14, and a load manipulator 16, in the form of a hydraulically operated dump bucket, mounted on the load carriage 15.

The secondary uprights 14 are nested within the inwardly facing channels 10a of primary uprights 10 and are mounted for vertical movement on the primary uprights in the manner disclosed in my U.S. Patent No. 2,-973,835 through upper rollers 17, shown in FIG. 6, which are secured to the upper ends of the primary uprights and rollers 18, shown in FIG. 7, which are secured to the lower ends of the secondary uprights.

Power for operating the dumping bucket 16 is supplied through a flexible hose 19 which is connected at one end through a suitable coupling 20 to the hydraulic actuator for the dumping bucket 16 and connected at the other end through a suitable coupling 21 to a length of tubing 22 secured to the back of one of the primary uprights 10. The tubing 22, in turn, is connected by a suitable coupling 23 to a flexible hose 24 from a source of power, such as a pump, on the truck T.

The hose 19 extends downwardly from the coupling 21 around a take-up reel 25, upwardly around a reel 26 which is secured to the top of the secondary uprights 14, and to the swivel coupling 20 to the hydraulic actuator for the dumping bucket 16.

In accordance with the invention, the take-up reel 25 is mounted for free rotation on a horizontally disposed stub shaft 27 which, in turn, is rigidly secured to an elongated mounting plate 28 adjacent the upper end of the mounting plate. The elongated mounting plate 28 is slidably received in the channel 10b of one of the primary uprights 10 between the flanges 10c and 10d thereof. The mounting plate 28 is retained in the channel 10a by a simple retaining plate 29 which extends between and is welded, or otherwise secured, to the free ends of the flanges 10c and 10d. The take-up reel 25 is thus mounted for vertical movement relatively to the primary upright 10, with the weight of the mounting plate 28 normally urging the take-up reel 25 downwardly.

As the load carriage 15 is raised from the position shown in FIG. 1 to the position shown in FIG. 2, the take-up reel 25 and the mounting plate 28 move downwardly under the weight thereof, taking up the slack in the hose 19. As the secondary uprights 14 and the load carriage 15 are moved above the upper ends of the primary uprights 10 to the position shown in FIG. 3, the mounting plate 28 and take-up reel 25 are raised by the hose 19 to pay out the hose as it is needed, until the load carriage 15 and the secondary uprights 14 reach the fully elevated position as shown in FIG. 4. Thus, the take-up reel 25 maintains the hose 19 under tension and free of slack at all times during vertical movement of the load carriage 15 and the secondary uprights 14. As best shown in FIG. 4, the length of the mounting plate 28 relatively to the retaining plate 29 is such that a portion of the mounting plate 28 is behind the retaining plate 29 at all times, even when the mounting plate 28 is fully elevated, so that the mounting plate 28 is retained within the channel 10b of the primary upright 10 in all vertical positions.

As best shown in FIGS. 5 and 6, the reel 26 is mounted for free rotation on a stub shaft 30 which is secured to a bracket 31. Bracket 31 in turn, is secured at one side to the upper end of the secondary upright 14 and at the other side to a cross brace 32 which is secured to and extends between the pair of secondary uprights 14.

When the hydraulic actuator for the dumping bucket 16 is of the double acting type, requiring two hoses, it will be appreciated that additional reels may be mounted on the stub shaft 30 and the stub shaft 27 to accommodate the second hose, or a second take-up arrangement generally designated at 33 (FIG. 1) may be mounted in the outwardly facing channel of the other primary upright 10 on the opposite side of the truck and connected to the source of power on the truck T through a length of tubing 34 and flexible hose 35. If the actuator for the bucket is electrically operated, the same take-up arrangement as described for the hose 19 may be used with an electric cable used in place of the hose 19.

From the preceding description, it can be seen that there is provided an inexpensive sliding reel arrangement for taking up the slack in a power line extending between the truck body and the vertically moving load lifting structure of a lift truck. While the invention has been described in conjunction with a lift truck which includes secondary uprights, it will be appreciated that the invention is also applicable to lift trucks in which the secondary uprights are eliminated and the load carriage is mounted for vertical movement directly on the primary uprights, and that the invention is also applicable to trucks having a third set of uprights, with the third set of uprights mounted for vertical movement on the secondary uprights and the load carriage, with the load manipulator, mounted on the third set of uprights. Also, other types of load manipulators, either hydraulically operated or electrically operated, may be mounted on the load carriage in place of the dumping bucket 16.

It will also be appreciated that whereas the reel 26 is shown in the drawings as mounted on the secondary uprights, it can be mounted on the top of the primary uprights in the manner as shown in United States Patent No. 2,736,445.

While a specific embodiment of the invention has been shown and described, it will be appreciated that this is for the purpose of illustration and that changes and modifications may be made therein without departing from the spirit and scope of the invention.

I claim:

In a lift truck, a pair of I section primary uprights each providing a pair of vertical channels,
- a pair of I-section extendable uprights mounted for vertical movement through means cooperating with one channel of each of said primary uprights,
- a load carriage, including a load manipulator, mounted for vertical movement on said extendable uprights,
- a mounting member slidably mounted in the other channel of one of said primary uprights, means secured to said one primary upright for retaining said mounting member in said channel during vertical sliding movement thereof,
- a take-up reel for a flexible power line rotatably mounted on said mounting member for vertical movement with said mounting member,
- a reel rotatably mounted on the upper end of one of said uprights above said take-up reel, and
- a flexible power line connected at one end to a power source on said truck and extending downwardly from the upper end of said one primary upright, around said take-up reel, upwardly around said reel secured to the upper end of said one upright and connected at the other end to the load manipulator on said load carriage, whereby said flexible power line is maintained under tension and slack in said power line is taken up by vertical movement of said take-up reel as said extendable uprights and load carriage are raised and lowered.

References Cited in the file of this patent

UNITED STATES PATENTS

| | | |
|---|---|---|
| 2,724,520 | Overbeck | Nov. 22, 1955 |
| 2,736,445 | Hoban | Feb. 28, 1956 |
| 2,932,419 | Harris | Apr. 12, 1960 |
| 2,973,835 | Quayle | Mar. 7, 1961 |